United States Patent
Gärtner et al.

(10) Patent No.: US 7,078,110 B2
(45) Date of Patent: Jul. 18, 2006

(54) SLIDE BEARING

(75) Inventors: Walter Gärtner, Gmunden (AT); Hubert Lang, Au an der Donau (AT); Soji Kamiya, Toyota (JP); Takashi Tomikawa, Toyota (JP)

(73) Assignees: Miba Gleitlager GmbH, Laakirchen (AT); Taiho Kogyo Co., Ltd., Toyota (JP)

( * ) Notice: Subject to any disclaimer, the term of this patent is extended or adjusted under 35 U.S.C. 154(b) by 0 days.

(21) Appl. No.: 11/009,472

(22) Filed: Dec. 10, 2004

(65) Prior Publication Data

US 2005/0129974 A1    Jun. 16, 2005

(30) Foreign Application Priority Data

Dec. 11, 2003    (AT) ................. A 1988/2003

(51) Int. Cl.
*B32B 15/20*    (2006.01)
*B32B 15/01*    (2006.01)

(52) U.S. Cl. .................. 428/652; 428/674; 384/912; 384/913

(58) Field of Classification Search ............... 428/650, 428/652
See application file for complete search history.

(56) References Cited

U.S. PATENT DOCUMENTS

| | | | | |
|---|---|---|---|---|
| 5,434,012 A | * | 7/1995 | Tanaka et al. ............. | 428/643 |
| 5,864,745 A | * | 1/1999 | Kawagoe et al. ........... | 428/553 |
| 6,015,775 A | * | 1/2000 | Takayama et al. .......... | 508/103 |
| 6,245,718 B1 | * | 6/2001 | Romanov et al. ........... | 508/103 |
| 6,346,215 B1 | * | 2/2002 | Boegel et al. .............. | 420/470 |
| 6,770,381 B1 | * | 8/2004 | Kanayama et al. ......... | 428/626 |
| 2002/0142186 A1 | * | 10/2002 | Sato et al. ................... | 428/676 |
| 2002/0192490 A1 | * | 12/2002 | Kanayama et al. ......... | 428/626 |
| 2003/0111905 A1 | * | 6/2003 | Takayama .................. | 305/202 |

FOREIGN PATENT DOCUMENTS

| | | | |
|---|---|---|---|
| EP | 984182 A1 | | 3/2000 |
| JP | 02-125829 | * | 5/1990 |
| JP | 2006-130891 | * | 2/2006 |
| SU | 692898 A | * | 10/1979 |

* cited by examiner

Primary Examiner—Jennifer McNeil
Assistant Examiner—Jason L. Savage
(74) Attorney, Agent, or Firm—Collard & Roe, P.C.

(57) ABSTRACT

A slide bearing is described with a bearing metal layer on copper basis as applied to a carrier and a running layer made of an alloy of aluminum and tin which is applied physically onto the bearing metal layer in vacuum. In order to combine favorable resistance against wearing with a low inclination towards jamming with advantageous tribological properties it is proposed that the bearing metal layer consists of an alloy with 4 to 8% by weight of tin, 0.6 to 1% by weight of silver, 1 to 2% by weight of an iron phosphide and 0 to 0.15% by weight of carbon, preferably in the form of graphite, and the remainder of copper.

2 Claims, 1 Drawing Sheet

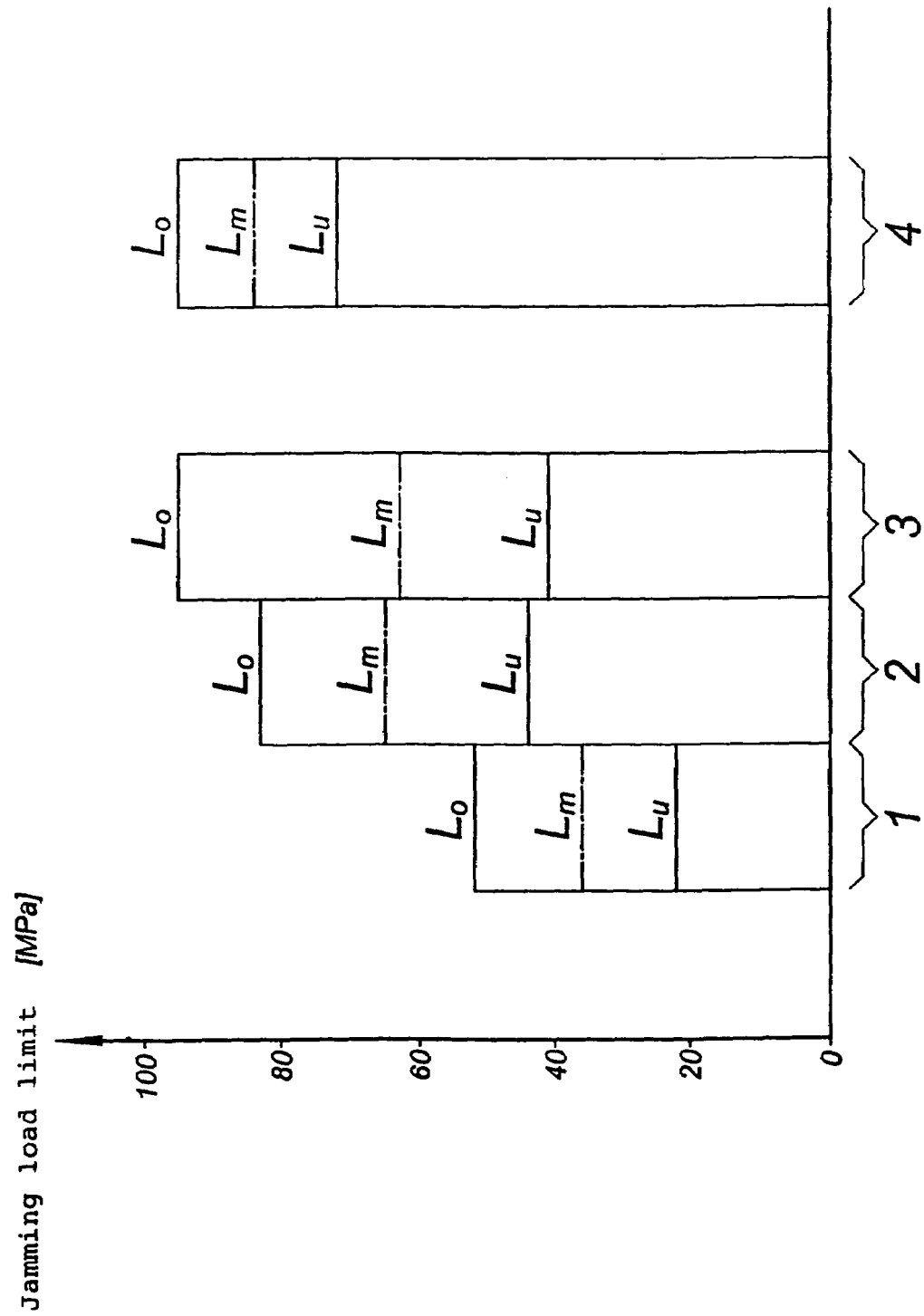

SLIDE BEARING

FIELD OF THE INVENTION

The invention relates to a slide bearing with a bearing metal layer on copper basis as applied to a carrier and a running layer made of an alloy of aluminum and tin which is applied physically onto the bearing metal layer in vacuum.

DESCRIPTION OF THE PRIOR ART

In order to improve the resilience of slide bearings with a bearing metal layer on the basis of copper and lead it is known to deposit by electrodepositing on said bearing metal layer a running layer made of an alloy of lead and tin. Although this configuration of the bearing leads to a considerable increase in the average load limit at which jamming (i.e. the local welding between the running layer and the shaft) occurs, one must still take considerable wear and tear into account with such a soft running layer. If on the other hand a running layer made of an alloy of aluminum and tin is applied physically by cathode sputtering in vacuum onto the bearing metal layer made on the basis of copper and lead, then the wearing behavior of the running layer can be improved considerably. Nevertheless, the inclination to seize up by this slide bearing with a running layer which is made of an alloy of tin and aluminum and which is sputtered onto the bearing metal layer is unsatisfactory at higher bearing loads, even if the hardness of the bearing metal layer is increased by partly replacing the lead share by tin and a thus resulting reduction of the share in the lead.

SUMMARY OF THE INVENTION

The invention is thus based on the object of providing a slide bearing of the kind mentioned above that the tendency towards jamming can be reduced considerably at higher loads of the bearing.

The invention achieves the object in such a way that the bearing metal layer consists of an alloy with 4 to 8% by weight of tin, 0.6 to 1% by weight of silver, 1 to 2% by weight of an iron phosphide and 0 to 0.15% by weight of carbon, preferably in the form of graphite, and the remainder of copper.

By providing a lead-free bearing metal layer on the basis of copper with tin, silver and an iron phosphide as elements of the alloy, the average limit load for the occurrence of jamming could be increased advantageously in a surprising way, although the structure and composition of the running layer on the basis of a sputtered alloy of aluminum and tin was not changed. This is presumably due to the fact that the chosen bearing metal layer merely comprises inclusions of harder iron phosphide particles in contrast to conventional bearing metal layers with softer lead inclusions and can thus locally be subjected to higher strain in comparison with the softer lead inclusions of the bearing metal layer on the basis of copper and lead.

Lead-free bearing metals on the basis of copper with 0.1 to 2% by weight of silver and 1 to 10% by weight of tin as the relevant components of the alloy are already known (EP 984 182 A1), but it is desirable in these known bearing metals to achieve a hexagonal silver/tin phase in the surface forming the running layer as a result of the heating occurring during operation in order to achieve respective tribological properties for higher load requirements. To ensure that the bearing can be stressed in a comparative manner even prior to the formation of a distinctive silver/tin phase in the running layer, the running surface needs to be additionally covered with a thin layer made of a thermoplastic material, so that a state of the art cannot anticipate the use of a lead-free bearing metal on the basis of copper with tin and silver as the alloy elements for reducing the tendency towards jamming of slide bearings with a sputtered running layer on the basis of an aluminum/tin alloy.

Although the alloy in accordance with the invention for the bearing metal layer supplies good results even without carbon, a low amount of carbon of up to 0.15% by weight can be used advantageously for certain bearing requirements. Better results are achieved with graphite instead of an amorphous carbon.

BRIEF DESCRIPTION OF THE DRAWING

The drawing shows the known slide bearings with a bearing metal layer on the basis of copper and lead in comparison with, slide bearings in accordance with the invention with a lead-free bearing metal layer. The load limit for the occurrence of jamming is shown in a block diagram.

DESCRIPTION OF THE PREFERRED EMBODIMENTS

A series of several slide bearings of the same design was subjected under comparable conditions to a static load which was increased gradually until the occurrence of jamming. The load limit measured during the occurrence of jamming in MPa was entered in the block diagrams for the bearing with the lowest and the highest jamming limit load of each series in combination with the average jamming limit load calculated for all slide bearings of this series.

The block diagram 1 for a slide bearing with bearing metal layer which is applied to a steel beam, forms the running surface per se and comprises 78% by weight of copper, 20% by weight of lead and 2% by weight of tin shows a jamming limit load $L_u$ of 22 MPa for the slide bearing with the highest tendency toward jamming. The highest jamming limit load $L_o$ was determined with 55 MPa, namely at an average jamming limit load $L_m$ of 36 MPa. The tendency towards jamming was considerably reduced with an electrodeposited running layer on the basis of lead with 18% by weight of tin and 2% by weight of copper on such a bearing metal layer made of CuPb20Sn2. According to block diagram 2, the lowest jamming limit load $L_u$ was 44 MPa for this slide bearing series, the highest limit load $L_o$ was 83 MPa and the average jamming limit load $L_m$ was 65 MPa. The application of a sputtered running layer made of an aluminum alloy with 20% by weight of tin as a relevant alloy element on a bearing metal layer of CuPb20Sn2 does not have a marked influence on the jamming behavior of the bearing depending on the bearing load according to block diagram 3. However, it has a decisive influence on the wearing behavior which is not shown in the block diagram, which shows for this series of slide bearings a lowermost jamming limit load $L_u$ of 41 MPa, a top jamming limit load $L_o$ of 95 MPa and an average jamming limit load $L_m$ of 63 MPa.

In comparison with these known slide bearings, the series of the slide bearings in accordance with the invention showed according to block diagram 4 a surprising increase in the jamming limit load. For a bearing metal layer made of 91.5% by weight of copper, 6.5% by weight of tin, 0.9% by weight of silver and 1.1% by weight of iron (tri) phosphide and a conventional sputtered running layer on aluminum basis with 20% by weight of tin, the lowermost jamming limit load $L_u$ of the examined bearing series was 72 MPa, the highest jamming limit load $L_o$ was 95 MPa and the average jamming limit load $L_m$ was 84 MPa, namely with favorable wearing behavior as a result of the sputtered running layer.

The invention claimed is:

1. A slide bearing with a bearing metal layer on copper basis as applied to a carrier and a running layer made of an alloy of aluminum and tin which is applied physically onto the bearing metal layer in vacuum, characterized in that the bearing metal layer consists of an alloy with 4 to 8% by weight of tin, 0.6 to 1% by weight of silver, 1 to 2% by weight of an iron phosphide and 0 to 0.15% by weight of carbon, and the remainder of copper.

2. The slide bearing of claim 1, wherein the carbon is in the form of graphite.

* * * * *